United States Patent
Hong et al.

(10) Patent No.: US 9,172,066 B2
(45) Date of Patent: Oct. 27, 2015

(54) PROTECTION CIRCUIT BOARD, BATTERY PACK INCLUDING THE PROTECTION CIRCUIT BOARD AND METHOD OF FABRICATING THE PROTECTION CIRCUIT BOARD

(75) Inventors: Ki-Sung Hong, Suwon-si (KR); In-Kyu Park, Suwon-si (KR); Woo-Choul Kim, Suwon-si (KR); Bum-Kuk Choi, Suwon-si (KR); Chang-Ho Kim, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1506 days.

(21) Appl. No.: 12/230,606

(22) Filed: Sep. 2, 2008

(65) Prior Publication Data
US 2009/0068501 A1    Mar. 12, 2009

(30) Foreign Application Priority Data

Sep. 10, 2007  (KR) .................. 10-2007-0091821
Sep. 20, 2007  (KR) .................. 10-2007-0096180
Oct. 11, 2007  (KR) .................. 10-2007-0102469

(51) Int. Cl.
*H01M 14/00* (2006.01)
*H01M 2/02* (2006.01)
(Continued)

(52) U.S. Cl.
CPC ............ *H01M 2/021* (2013.01); *H01M 2/1061* (2013.01); *H01M 2/30* (2013.01); *H01M 10/425* (2013.01); *H01M 10/4257* (2013.01); *H01M 10/0525* (2013.01); *Y10T 29/49108* (2015.01)

(58) Field of Classification Search
CPC .................. H01M 10/425; H01M 10/4257

USPC ......................... 429/7, 61, 121, 122
See application file for complete search history.

(56) References Cited

U.S. PATENT DOCUMENTS 6,437,239 B1 *  8/2002  Zayatz .................... 174/527
6,524,732 B1 *  2/2003  Iwaizono et al. ............ 429/7
(Continued)

FOREIGN PATENT DOCUMENTS

JP    2001-250532    9/2001
JP    2002-216724    8/2002
(Continued)

OTHER PUBLICATIONS

Chinese Office Action with English translation issued on Dec. 4, 2009 (Appl. No. 200810212962.8).

(Continued)

*Primary Examiner* — Ula C Ruddock
*Assistant Examiner* — Amanda Barrow
(74) *Attorney, Agent, or Firm* — Robert E. Bushnell, Esq.

(57) ABSTRACT

A protection circuit board resulting in a compact battery pack having a higher capacity than a conventional battery pack of the same size, a battery pack including the protection circuit board and a method of fabricating the protection circuit board includes: a first lead terminal disposed on a first side of the protection circuit board; and a first aperture for exposing the first lead terminal to a second side of the protection circuit board. The battery pack also includes: a bare cell including an electrode terminal; a second lead terminal arranged over the electrode terminal; and a protection circuit board electrically connected to the second lead terminal and the bare cell, and having an aperture for exposing the second lead terminal arranged the first side of the protection circuit board to the second side of the protection circuit board.

11 Claims, 8 Drawing Sheets

(51) Int. Cl.
*H01M 10/42* (2006.01)
*H01M 2/10* (2006.01)
*H01M 2/30* (2006.01)
*H01M 10/0525* (2010.01)

(56) References Cited

U.S. PATENT DOCUMENTS

| | | |
|---|---|---|
| 7,037,608 B2 | 5/2006 | Nishimura et al. |
| 2003/0077486 A1* | 4/2003 | Iwaizono et al. ............ 429/7 |
| 2003/0211385 A1* | 11/2003 | Yamazaki et al. ............ 429/158 |
| 2005/0122667 A1* | 6/2005 | Moon ............................ 361/600 |
| 2005/0153195 A1 | 7/2005 | Han |
| 2005/0200447 A1 | 9/2005 | Chandler et al. |
| 2005/0208346 A1 | 9/2005 | Moon et al. |
| 2005/0214597 A1 | 9/2005 | Kim et al. |
| 2005/0221687 A1* | 10/2005 | Nakamura et al. ............ 439/751 |
| 2006/0003192 A1 | 1/2006 | Lim |
| 2006/0019160 A1* | 1/2006 | Han ............................... 429/185 |
| 2006/0019531 A1 | 1/2006 | Moon |
| 2006/0251931 A1 | 11/2006 | Kim |
| 2007/0154796 A1* | 7/2007 | Uh ............................... 429/174 |
| 2007/0202364 A1* | 8/2007 | Uh et al. ....................... 429/7 |
| 2007/0202396 A1* | 8/2007 | Jung ............................. 429/174 |

FOREIGN PATENT DOCUMENTS

| | | |
|---|---|---|
| JP | 2003-077451 | 3/2003 |
| JP | 2003-157904 | 5/2003 |
| JP | 3696097 | 7/2005 |
| JP | 2006-186299 | 7/2006 |
| KR | 10-2005-0081175 | 8/2005 |
| KR | 10-2005-0082424 | 8/2005 |
| KR | 10-0537540 | 12/2005 |
| KR | 10-0542677 | 1/2006 |
| KR | 10-2006-0027692 | 3/2006 |
| KR | 10-0561299 | 3/2006 |
| KR | 10-2006-0046292 | 5/2006 |
| KR | 10-2006-0050550 | 5/2006 |
| KR | 10-0601529 | 7/2006 |
| KR | 10-20060085875 | 7/2006 |
| KR | 10-2006-0088230 | 8/2006 |
| KR | 10-2006-0104312 | 10/2006 |
| KR | 10-2006-0115208 | 11/2006 |
| KR | 10-2006-0134401 | 12/2006 |
| WO | 2005/055343 A1 | 6/2005 |

OTHER PUBLICATIONS

Korean Notice of Allowance issued on Jan. 12, 2010 in the corresponding Korean Patent Application No. 10-2007-0102469.

* cited by examiner

PROTECTION CIRCUIT BOARD, BATTERY PACK INCLUDING THE PROTECTION CIRCUIT BOARD AND METHOD OF FABRICATING THE PROTECTION CIRCUIT BOARD

CLAIM OF PRIORITY

This application makes reference to, incorporates the same herein, and claims all benefits accruing under 35 U.S.C. §119 from three applications, Korean Patent Application Nos. 2007-0091821, 2007-0096180, and 2007-0102469, earlier filed in the Korean Intellectual Property Office on the 10 of Sep. 2007, the 20 of Sep. 2007, and the 11 of Oct. 2007, respectively.

BACKGROUND OF THE INVENTION

1. Field of the Invention

The present invention relates to a protection circuit board, a battery pack including the protection circuit board and a method of fabricating the protection circuit board, and more particularly, the present invention relates to a protection circuit board which can realize a compact battery pack and a higher capacity than a conventional battery pack having the same size by changing electrical connections between a bare cell and a protection circuit board, a battery pack including the protection circuit board and a method of fabricating the protection circuit board.

2. Description of the Related Art

In recent times, various compact handheld electronic/electrical devices, such as cellular phones, notebook computers, camcorders, and so on, have been widely developed and produced. The handheld electronic/electrical devices include a battery pack installed therein to operate the devices without a separate power source. Battery packs may be classified into nickel-cadmium (Ni—Cd) batteries, nickel-metal hydride (Ni-MH) batteries, and lithium (Li) batteries. A battery pack using a secondary (rechargeable) battery is generally used in consideration of economic efficiency.

Among the types of batteries, the lithium ion secondary battery is widely used for the handheld electronic/electrical devices due to an operating voltage three times higher and a higher energy density per unit weight than the Ni—Cd battery and the Ni-MH battery. Lithium ion secondary batteries may be classified into Li ion batteries using a liquid electrolyte and Li polymer batteries using a polymer electrolyte depending on the kind of electrolytes, or may be classified into a cylindrical, rectangular or pouch type batteries, depending on the shape thereof.

Generally, a battery pack includes a bare cell which can be charged or discharged, and a protection circuit board electrically connected to the bare cell.

The bare cell is formed by accommodating an electrode assembly including a positive electrode plate, a negative electrode plate and a separator disposed therebetween, and an electrolyte in a can, and sealing the can with a cap assembly including an electrode terminal electrically connected to either the positive electrode plate or the negative electrode plate.

The positive or negative electrode plate which is not electrically connected to the electrode terminal is electrically connected to a cap plate of the cap assembly or to the can, which thus serves as a terminal, and the electrode terminal is electrically insulated from the cap plate and the can.

The protection circuit board is electrically connected to the electrode terminal of the bare cell, and to the cap plate or the can, thereby controlling voltage or current during charging/discharging of the bare cell to prevent an overvoltage or overcurrent in the bare cell.

The battery pack is fabricated by arranging an electrode assembly into an opening on one side the can. The electrode assembly includes a positive electrode plate and a negative electrode plate formed by applying a positive electrode active material and a negative electrode active material to a positive electrode collector and a negative electrode collector and a separator formed between the positive electrode plate and the negative electrode plate and then stacking and winding them.

Then, a cap assembly is attached to the open side of the can, an electrolyte is injected into the can through an electrolyte injection hole of the cap assembly, and the electrolyte injection hole is sealed, thus completing the bare cell.

Subsequently, a first lead plate and a second lead plate respectively electrically connected to an electrode terminal and a cap plate or a can of the bare cell, are electrically connected to third and fourth lead plates, which are electrically connected to the protection circuit board, and a space formed due to the electrical connection between the first to fourth lead plates is filled using resin, thereby preventing an occurrence of an electrical short-circuit between the bare cell and the protection circuit board, thus completing the battery pack.

To electrically connect a bare cell to a protection circuit board, in the conventional battery pack, first and second lead plates electrically connected to the bare cell were electrically connected to third and fourth lead plates electrically connected to the protection circuit board using a soldering process or a welding process, such as resistance welding. Also, a specific-sized space should be maintained between the bare cell and the protection circuit board for smooth welding. Thus, the space between the bare cell and the protection circuit board could not be smaller than a predetermined amount.

Also, in order to prevent an occurrence of electrical short-circuits due to moving of the bare cell and the protection circuit board, the space between the bare cell and the protection circuit board is filled in. However, defects may occur in the filling process, or the bare cell or the protection circuit board may be misplaced, thereby making electrical connection therebetween unstable.

SUMMARY OF THE INVENTION

The present invention provides a protection circuit board which can result in a compact battery pack having a higher capacity than a conventional battery pack of the same size, and which reinforces the bonding strength between the bare cell and the protection circuit board without a molding process by changing the electrical connection between the bare cell and the protection circuit board to minimize the space between the bare cell and the protection circuit board. The present invention also provides a battery pack including the protection circuit board, and a method of fabricating the protection circuit board.

According to one aspect of the present invention, a protection circuit board of a battery pack includes: a first lead terminal disposed at one side of the protection circuit board; and a first aperture for exposing the first lead terminal to the other side of the protection circuit board.

According to another aspect of the present invention, a battery pack includes: a bare cell including an electrode terminal; a second lead terminal disposed over the electrode terminal; and a protection circuit board electrically connected to the second lead terminal and the bare cell, and having a third aperture for exposing the second lead terminal disposed at one side of the protection circuit board to the other side of the protection circuit board.

According to still another aspect of the present invention, a method of fabricating a battery pack includes: preparing a bare cell having an electrode terminal and a protection circuit board having an eighth aperture; disposing a fifth lead terminal at one side of the protection circuit board to be at least partially exposed to the other side of the protection circuit board through the eighth aperture; electrically connecting the fifth lead terminal to the protection circuit board; arranging the bare cell and the protection circuit board such that the fifth lead terminal is disposed over the electrode terminal; and electrically connecting the fifth lead terminal to the electrode terminal through the eighth aperture.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

The above and other objects, features and functions of the present invention are described more fully below with reference to accompanying drawings. Moreover, in the drawings, the length and thickness of an element or a region may be exaggerated for clarity. Also, like numerals denote like elements throughout the specification. A part is "connected" with another part, means that these are either "directly connected", or "electrically connected" to each other having a third device therebetween.

Figure 1:
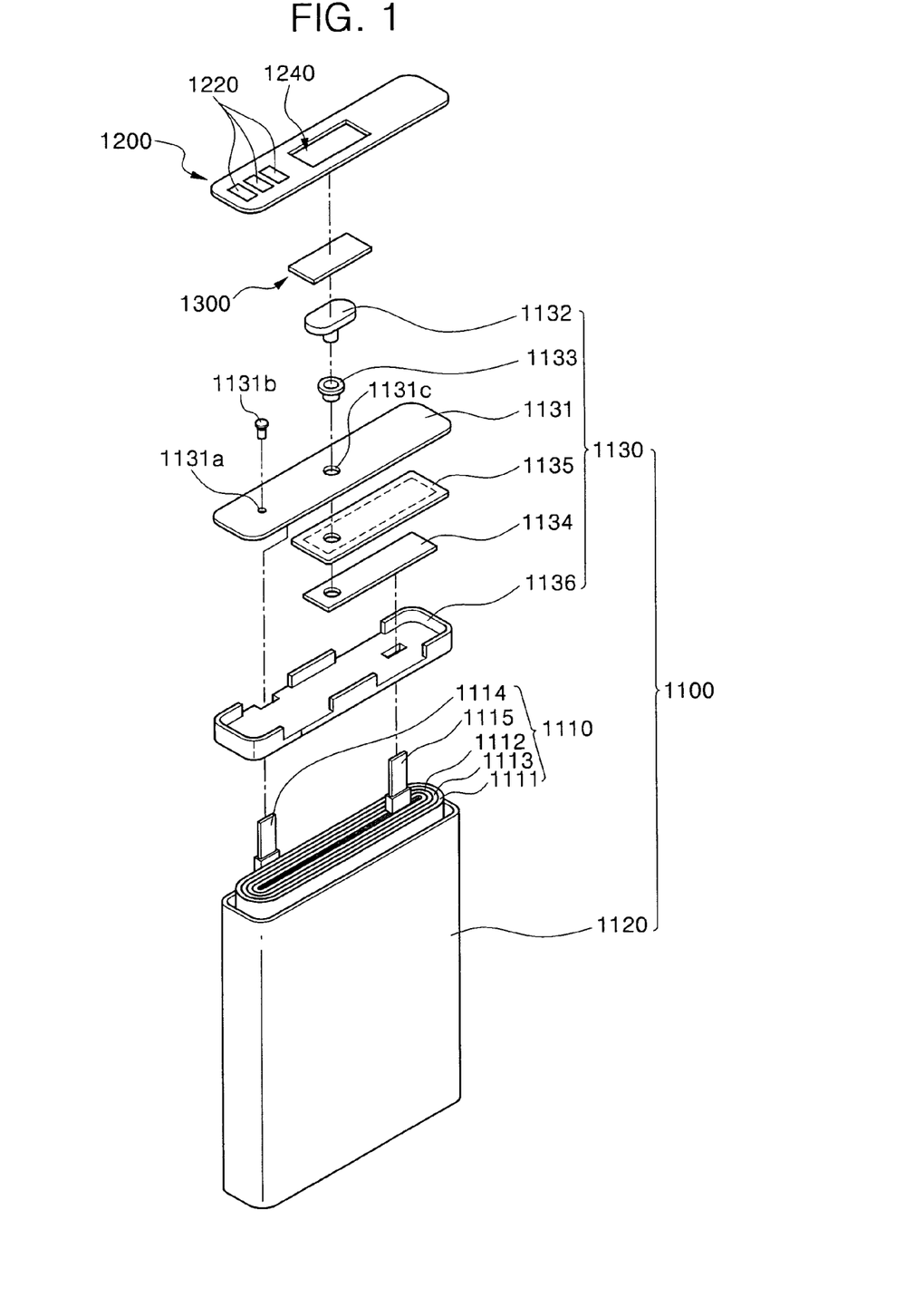
FIG. 1 is an exploded perspective view of a battery pack according to a first exemplary embodiment of the present invention.
Figure 2A:
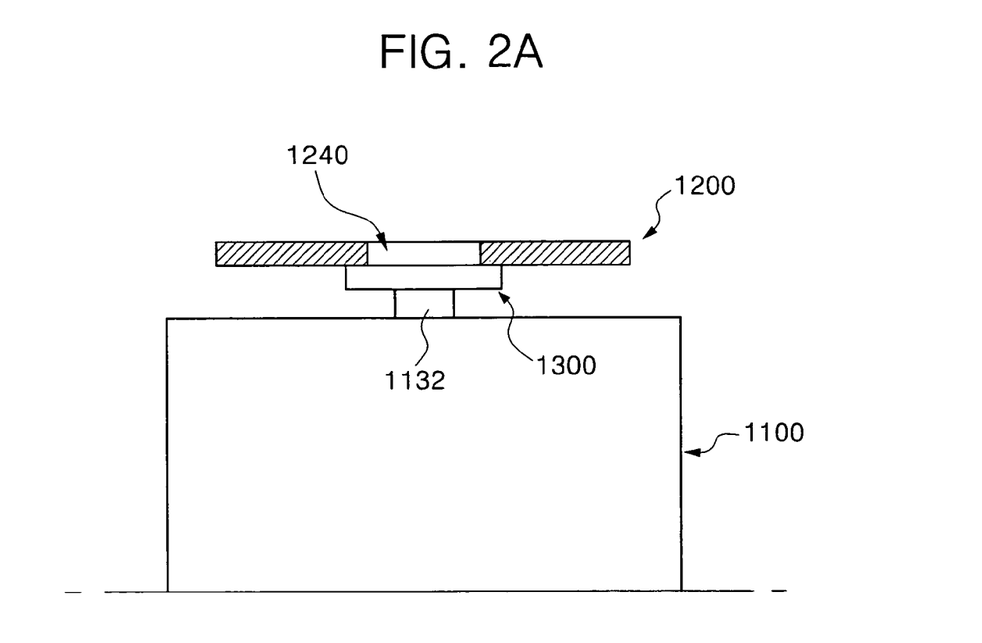
FIGS. 2A and 2B are cross-sectional views of an aperture formed in a protection circuit board of the battery pack according to the first exemplary embodiment of the present invention.
Figure 2B:
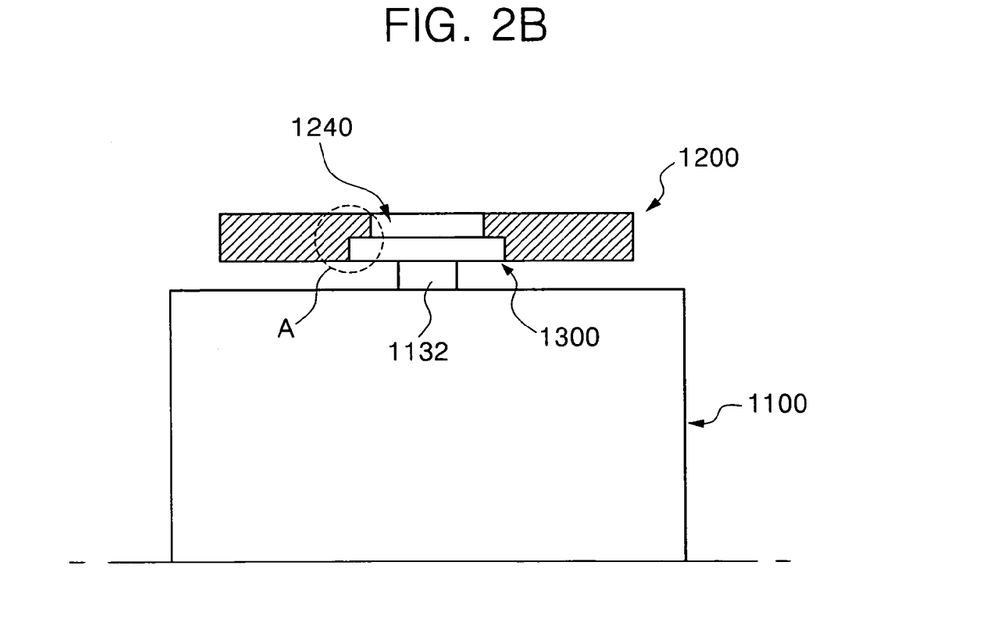

FIG. 1 is an exploded perspective view of a battery pack according to a first exemplary embodiment, and FIGS. 2A and 2B are cross-sectional views of an aperture formed in a protection circuit board of the battery pack according to the first exemplary embodiment of the present invention.

Referring to FIGS. 1, 2A and 2B, a battery pack according to a first exemplary embodiment of the present invention includes a bare cell 1100, a first lead terminal 1300 disposed on an electrode terminal of the bare cell 1100, and a protection circuit board 1200 electrically connected to the bare cell 1100 through the first lead terminal 1300 and having a first aperture 1240 corresponding to a part of the first lead terminal 1300.

The bare cell 1100 includes an electrode assembly 1110, a can 1120 accommodating an electrolyte (not illustrated) to allow lithium ions to move within the electrode assembly 1110, and a cap assembly 1130 sealing the can 1120. The electrode assembly 1110 includes a positive electrode plate 1111 having a positive electrode tab 1114 connected to a positive electrode collector (not illustrated) to which a positive electrode active material (not illustrated) is applied, a negative electrode plate 1112 having a negative electrode tab 1115 connected to a negative electrode collector (not illustrated) to which a negative electrode active material (not illustrated) is applied, and a separator 1113 interposed between the positive and negative electrode plates 1111 and 1112.

In FIG. 1, the positive electrode tab 1114 is disposed at an edge of the can 1120 and the negative electrode tab 1115 is disposed in the middle of the can 1120, and the negative electrode tab 1115 is electrically connected to an electrode terminal 1132 of the cap assembly 1130. However, the positive electrode tab 1114 and the negative electrode tab 115 may be oppositely disposed, and unlike the drawing, one of the positive electrode tab 1114 and the negative electrode tab 1115 may project down to the can 1120 to be electrically connected to the can 1120.

The positive electrode active materials may include a lithium-contained transition metal oxide and a lithium chalcogenide compound, such as $LiCoO_2$, $LiNiO_2$, $LiMnO_2$, $LiMn_2O_4$ and $LiNi_{1-x-y}CoxM_{y-2}$ (herein, $0 \leq x \leq 1$, $0 \leq y \leq 1$, $0 \leq x+y \leq 1$, and M is a metal, such as Al, Sr, Mg or La), and the negative electrode active material may include carbon materials, such as crystalline carbon, amorphous carbon, carbon complex and carbon fiber, lithium metal and a lithium alloy.

The positive electrode collector or the negative electrode collector may be formed of a metal selected from the group consisting of stainless steel, nickel, copper, aluminum and an alloy thereof. Preferably, the positive electrode collector is formed of aluminum or an aluminum alloy and the negative electrode collector is formed of copper or a copper alloy to maximize their efficiencies.

The separator 1113 is interposed between the positive electrode plate 1111 and the negative electrode plate 1112 to prevent electrical short-circuits and allow movement of lithium ions. The separator 1113 may be formed of a polyolefin series polymer layer, for example, formed of polyethylene (PE) or polypropylene (PP), or a multi-layer thereof.

As illustrated in FIG. 1, the can 1120 may be formed of a prismatic metallic material having an open top, or formed in a cylinder shape or a pouch shape. The can 1120 may be formed of aluminum, an aluminum alloy or stainless steel, which is light-weight and flexible, to serve as a terminal.

The cap assembly 1130 attached to the open top of the can 1120 includes a cap plate 1131, an insulating plate 1135, a terminal plate 1134, an insulating case 1136 and an electrode terminal 1132. The cap plate 1131 is a metal plate having the size and shape corresponding to the top opening of the can 1120, and includes a terminal through-hole 1131c having predetermined size, an electrolyte injection hole 1131a and a safety vent (not illustrated). The safety vent may be formed in any region which does not interfere with the terminal through-hole 1131c and the electrolyte injection hole 1131a, or may be formed on a side of the can 1120.

The electrolyte injection hole 1131a is to inject an electrolyte which facilitates the movement of lithium ions into the can 1120 accommodating the electrode assembly 1110. After the can 1120 is sealed by the cap assembly 1130, the electrolyte is injected through the electrolyte injection hole 1131a, and then the electrolyte injection hole 1131a is plugged with an electrolyte injection hole plug 1131b.

The terminal through-hole 1131c is to insert the electrode terminal 1132 which is electrically connected to the terminal plate 1134 disposed under the cap plate 1131 through the terminal through-hole 1131c. In order to insulate the electrode terminal 1132 from the cap plate 1131, a gasket 1133 formed of rubber or non-conductive material having good insulating properties is disposed around the electrode terminal 1132.

The insulating plate 1135 and the terminal plate 1134 are sequentially disposed under the cap plate 1131, and the terminal plate 1134 is electrically connected to the negative electrode tab 1115 of the electrode assembly 1110 to make electrical connection between the electrode terminal 1132 and the negative electrode tab 1115. The insulating plate 1135 electrically insulates the terminal plate 1134 from the cap plate 1131 so as not to be short-circuited even though the cap plate 1131 is electrically connected to the positive electrode tab 1114 of the electrode assembly 1110.

The insulating case 1136 is disposed in a direction of the opening of the can 1120 of the electrode assembly 1110 to fix the positive electrode tab 1114 and the negative electrode tab 1115 of the electrode assembly 1110. The insulating case 1134 may be formed of insulating polymer resin, such as polypropylene (PP), polyphenylene sulfate (PPS), polyethersulfone (PES) or denatured polyphenyl oxide (PPO), and have a support at the edge thereof to provide a space for seating the terminal plate 1134 and the insulating plate 1135.

The protection circuit board 1200 has an outer terminal 1220 electrically connected to the outside and a first aperture 1240 exposing a part of the first lead terminal 1300, which is disposed at one side, to the other side. The first aperture 1240 may have a smaller area than the first lead terminal 1300, as illustrated in FIG. 2A, and may have a step A to accommodate the first lead terminal 1300, as illustrated in FIG. 2B.

Also, unlike FIG. 2A, the step A of the first aperture 1240 may be formed such that only a part of the first lead terminal 1300 is inserted, and in this case, the part of the first lead terminal 1300 may be bent to the first aperture 1240 to be inserted into the first aperture 1240.

Also, unlike FIG. 2A, the first lead terminal 1300 may have a smaller area than the electrode terminal 1132.

Moreover, not illustrated in the drawing, to prevent an overvoltage or overcurrent to the bare cell 1100, at least one protection device mounted on the protection circuit board 1200 is disposed at the same side as the first lead terminal 1300, and thus the battery pack according to the first exemplary embodiment of the present invention may be decreased in thickness, or have a higher capacity than a conventional battery pack having the same size.

The first lead terminal 1300 is electrically connected between the bare cell 1100 and the protection circuit board 1200, wherein the electrical connection maybe made by welding the first lead terminal 1300 to the protection circuit board 1200 around or inside the first aperture 1240, and by welding the first lead terminal 1300 to the electrode terminal 1132 of the bare cell 1100 through the first aperture 1240 of the protection circuit board 1200. The first lead terminal 1300 and the electrode terminal 1132 may be formed of the same material to be easily welded, or have a plating part for reinforcing conductivity in a region where the first lead terminal 1300 is in contact with the electrode terminal 1132. However, in consideration of weldability and conductivity, the first lead terminal 1300 and the electrode terminal 1132 are preferably formed of nickel.

Figure 2C:
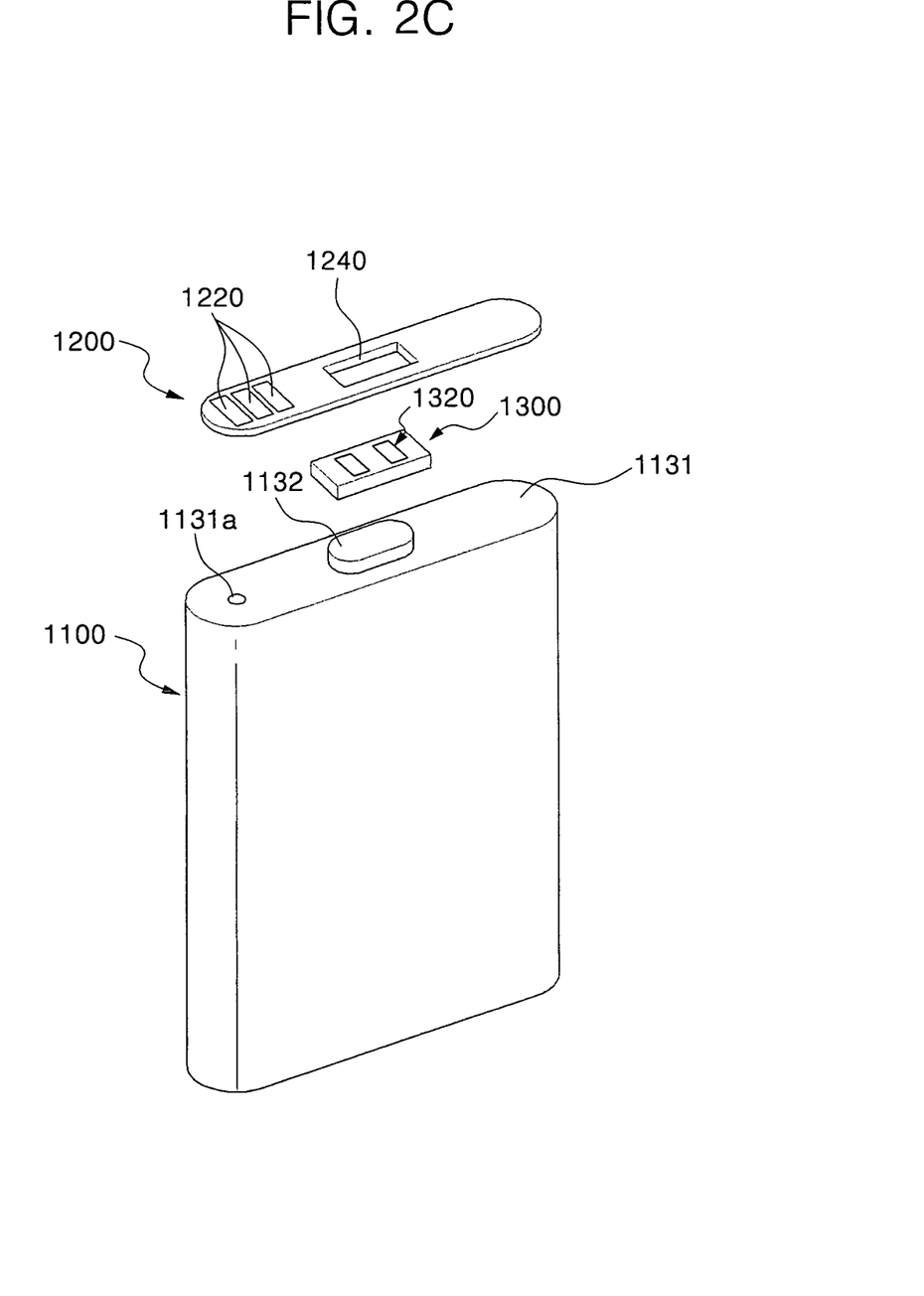
FIG. 2C is an exploded perspective view of a lead terminal of the battery pack according to the first exemplary embodiment of the present invention.

The first lead terminal 1300 may be electrically connected to the protection circuit board 1200 or the electrode terminal 1132 by soldering. In this case, the first lead terminal 1300, as illustrated in FIG. 2C, includes at least one second aperture 1320 disposed inside the first aperture 1240, and a space between the first and second apertures 1240 and 1320 may be filled with lead, thereby making electrical connection between the electrode terminal 1132, the first lead terminal 1300 and the protection circuit board 1200 at the same time.

Referring to FIGS. 1, 2A and 2B, according to a method of fabricating the battery pack according to the first exemplary embodiment of the present invention, a first lead terminal 1300 is disposed to be partially exposed to one side through a first aperture 1240 at the other side of a protection circuit board 1200 having the first aperture 1240, and the first lead terminal 1300 and the protection circuit board 1200 are electrically connected to each other around or inside the first aperture 1240. The protection circuit board 1200 and the first lead terminal 1300 may be electrically connected by soldering or welding, and preferably by resistance welding in consideration of an influence on at least one protection device mounted on the protection circuit board 1200 and bonding strength between the protection circuit board 1200 and the first lead terminal 1300.

Also, to reinforce the bonding strength and electrical connection between the protection circuit board 1200 and the first lead terminal 1300, the first lead terminal 1300 may be partially or entirely inserted into the first aperture 1240, and in this case, a step A may be formed inside the first aperture 1240 to accommodate all or part of the first lead terminal 1300.

Subsequently, to dispose the first lead terminal 1300 on the electrode terminal 1132 of the bare cell 1100, the bare cell 1100 and the protection circuit board 1200 are arranged. A secondary protection device, such as a Positive Temperature Coefficient (PTC) device, (not illustrated) may be interposed between the electrode terminal 1132 of the bare cell 1100 and the first lead terminal 1300. However, since the electrode terminal 1132 and the first lead terminal 1300 maybe welded or soldered in a subsequent process, the PTC device maybe mounted on the protection circuit board 1200.

Then, the electrode terminal 1132 and the first lead terminal 1300 are welded or soldered together through the first aperture 1240, thereby electrically connecting the bare cell 1100 to the protection circuit board 1200. The electrode terminal 1132 and the first lead terminal 1300 may be electrically connected to each other by soldering and welding, and preferably by resistance welding in consideration of an influence on the at least one protection mounted on the protection circuit board 1200 and an electrode assembly 1110 in the bare cell 1100 and the bonding strength between the protection circuit board 1200 and the bare cell 1100.

Also, to reinforce the conductivity and bonding strength between the electrode terminal 1132 and the first lead terminal 1300, the protection circuit board 1200 may have several first apertures 1240 and a plating part for reinforcing conductivity in a region where the first lead terminal 1300 is in contact with the electrode terminal 1132.

As a result, in the battery pack according to the first exemplary embodiment of the present invention, the first lead terminal electrically connected to the protection circuit board may be disposed on the electrode terminal of the bare cell, and the first lead terminal and the electrode terminal are electrically connected to each other through an aperture of the protection circuit board partially exposing the first lead terminal, thereby minimizing the space between the bare cell and the protection circuit board, and a part of the first lead terminal may be inserted into the aperture of the protection circuit board, thereby reinforcing bonding strength between the bare cell and the protection circuit board.

Figure 3A:
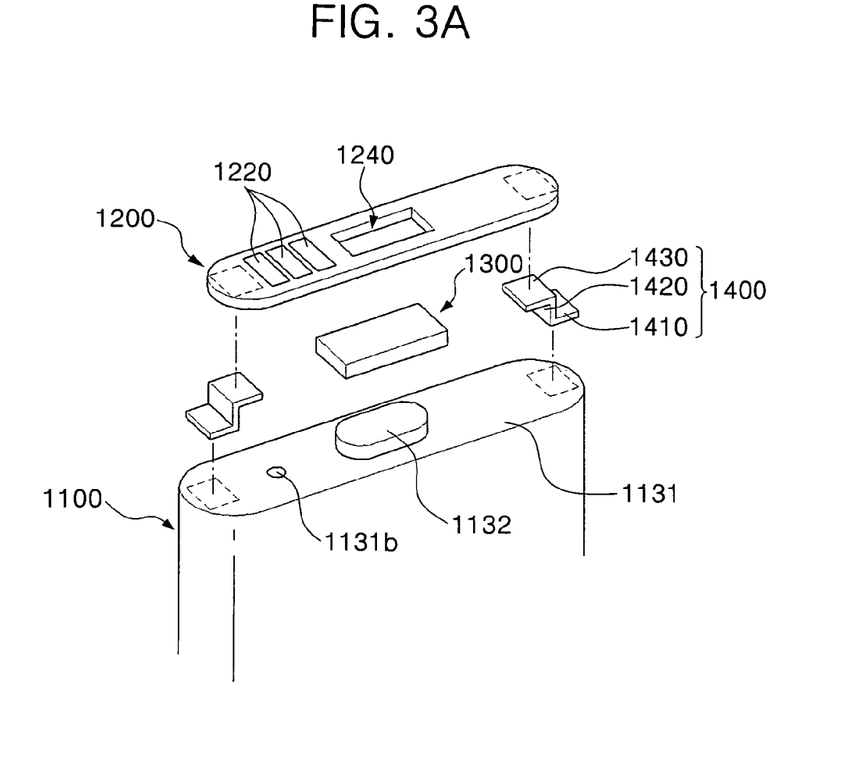
FIGS. 3A and 3B are respectively an exploded perspective view and a cross-sectional view of a battery pack according to a second exemplary embodiment of the present invention.
Figure 3B:
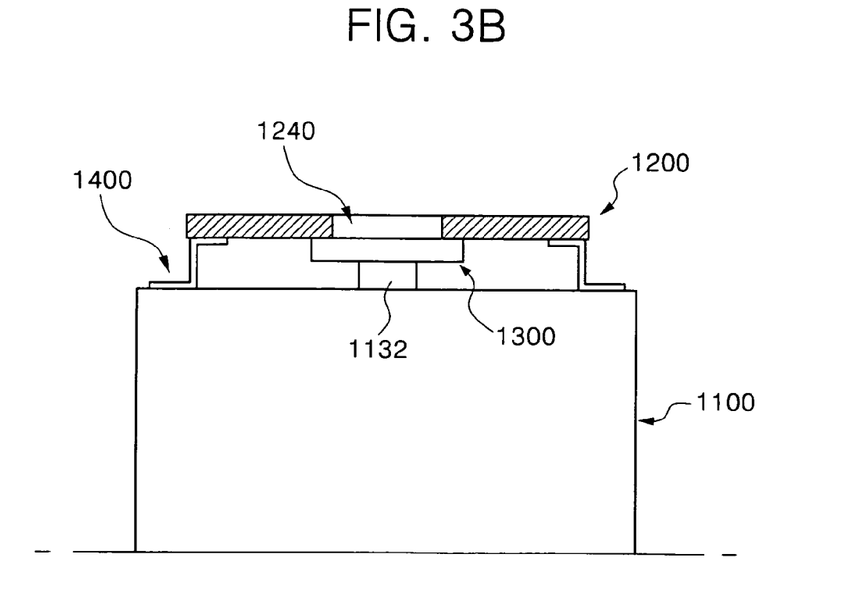

FIG. 3A is an exploded perspective view of a battery pack according to a second exemplary embodiment of the present invention, and FIG. 3B is a cross-sectional view of the battery pack according to the second exemplary embodiment of the present invention.

Referring to FIGS. 3A and 3B, the battery pack according to the second exemplary embodiment of the present invention includes a bare cell 1100, a first lead terminal 1300 disposed on an electrode terminal of the bare cell 1100, a protection circuit board 1200 electrically connected to the bare cell 1100 through the first lead terminal 1300 and having a first aperture 1240 corresponding to a part of the first lead terminal 1300, and a second lead terminal 1400 electrically connecting the protection circuit board 1200 to a cap plate 1131 electrically connected to a positive electrode plate or a negative electrode plate, which is not electrically connected to the electrode terminal 1132 electrically connected to the bare cell 1100.

The bare cell 1100, the first lead terminal 1300 and the protection circuit board 1200 have the same configurations as those in the battery pack according to the first exemplary embodiment of the present invention, which is not described below.

The second lead terminal 1400 is disposed at one side or both sides in a width direction of the protection circuit board 1200 facing the bare cell 1100, so as to prevent movement of the protection circuit board 1200 from the electrode terminal 1132 of the bare cell 1100, and reinforce bonding strength between the bare cell 1100 and the protection circuit board 1200.

The second lead terminal 1400 is divided into a first region 1410 in contact with the cap plate 1131, a second region 1420 in contact with the protection circuit board 1200 and a third region 1430 connecting the first region 1410 to the second region 1420, each region being bent to easily connect the cap plate 1131 to the protection circuit board 1200. Thus, the region may have any structure that does not increase the space between the cap plate 1131 and the protection circuit board 1200 due to the electrode terminal 1132 and the first lead terminal 1300.

The first and second regions 1410 and 1420 of the second lead terminal 1400 may be welded or soldered to the cap plate 1131 and the protection circuit board 1200, respectively, but the second lead terminal 1400 is preferably welded to the cap plate 1131 and the protection circuit board 1200 in consideration of the electrical connection and bonding strength between the bare cell 1100 and the protection circuit board 1200, and more preferably formed of a nickel material in consideration of the conductivity.

FIGS. 3A and 3B illustrate that the second lead terminal 1400 is disposed at both sides in a width direction of the protection circuit board 1200, but the second lead terminal 1400 may be disposed at one side of the protection circuit board 1200. In this case, a first coupling member (not illustrated) having the same shape as the second lead terminal 1400 is disposed at the other side of the protection circuit board 1200, and thus the bonding strength between the protection circuit board 1200 and the bare cell 1100 may be reinforced.

In FIGS. 3A and 3B, the area of the protection circuit board 1200 is smaller than the cap plate 1131, but the area may be the same as that of the cap plate 1131.

As a result, in the battery pack according to the second exemplary embodiment of the present invention, a first polarity between a bare cell and a protection circuit board is electrically connected by a first lead terminal disposed between an electrode terminal of the bare cell and the protection circuit board and the first aperture formed in the protection circuit board, and a second polarity opposite to the first polarity between the bare cell and the protection circuit board is electrically connected by directly connecting the cap plate of the bare cell to the protection circuit board by a second lead terminal disposed at one side or both sides in a width direction of the bare cell.

Figure 4:
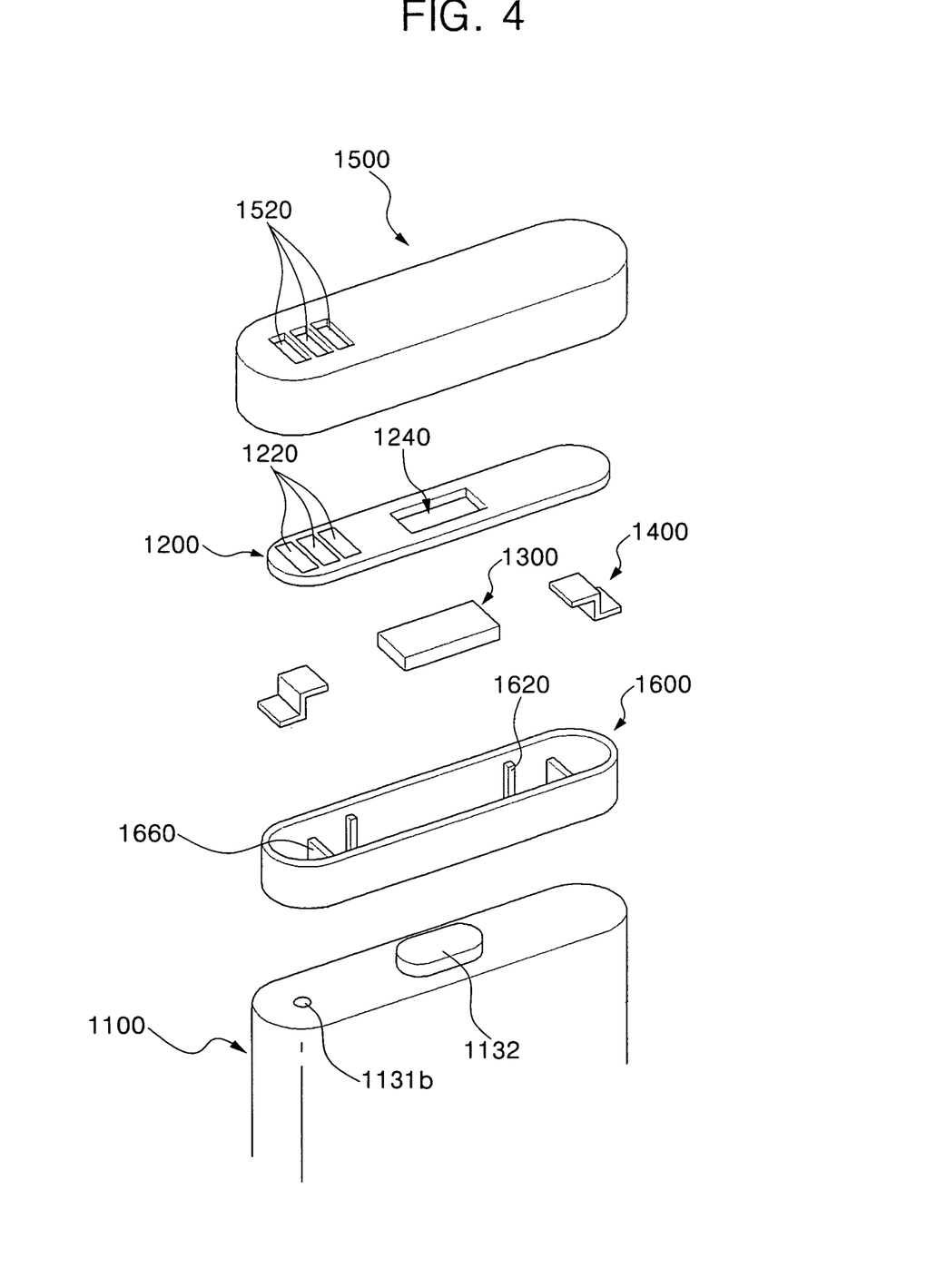
FIG. 4 is an exploded perspective view of a battery pack according to a third exemplary embodiment of the present invention.

FIG. 4 is an exploded perspective view of a battery pack according to a third exemplary embodiment of the present invention.

Referring to FIG. 4, the battery pack according to the third exemplary embodiment of the present invention includes a bare cell 1100, a first lead terminal 1300 disposed on an electrode terminal of the bare cell 1100, a protection circuit board 1200 electrically connected to the bare cell 1100 by the first lead terminal 1300 and having a first aperture 1240 corresponding to a part of the first lead terminal 1300, a second lead terminal 1400 electrically connecting a cap plate 1131 to a positive electrode plate or a negative electrode plate, which is not electrically connected to the electrode terminal 1132 electrically connected to the bare cell 1100, with the protection circuit board 1200, a support member 1600 interposed between the bare cell 110 and the protection circuit board 1200 to reinforce bonding strength between the bare cell 1100 and the protection circuit board 1200 and serving to seat the protection circuit board 1200, and an upper case 1500 surrounding the protection circuit board 1200.

The bare cell 1100, the first lead terminal 1300, the second lead terminal 1400 and the protection circuit board 1200 have the same configurations as the same elements in the first and second exemplary embodiments of the present invention, and accordingly, these elements have not been described again below.

The support member 1600 serves to seat and support the protection circuit board 1200 connected to the bare cell 1100, and thus further reinforce the bonding strength between the bare cell 1100 and the protection circuit board 1200. The support member 1600 may be formed around the bare cell 1100 to support a space between the bare cell 1100 and the protection circuit board 1200, and may be hollow to facilitate electrical connection between the bare cell 1100 and the protection circuit board 1200.

The support member 1600 may have a side stopper 1620, which projects inward from at least one surface thereof to seat the protection circuit board, and at least one end stopper 1660 connecting between long side surfaces of the support member 1600 to prevent deformation of the support member 1600.

The upper case 1500 surrounds the protection circuit board 1200 to prevent deformation of a protection device formed on the protection circuit board 1200 from external forces. The upper case 1500 may have an outer terminal aperture 1520 corresponding to an external terminal 1220 of the protection circuit board 1200 such that the protection circuit board 1200 can be electrically connected to the outside.

As a result, the battery pack according to the third exemplary embodiment of the present invention further includes a support member disposed between the bare cell and the protection circuit board and an upper case surrounding the protection circuit board, and thus, the bonding strength between the bare cell and the protection circuit board may be further reinforced, and movement of the bare cell and the protection circuit board due to external forces may be prevented.

Figure 5:
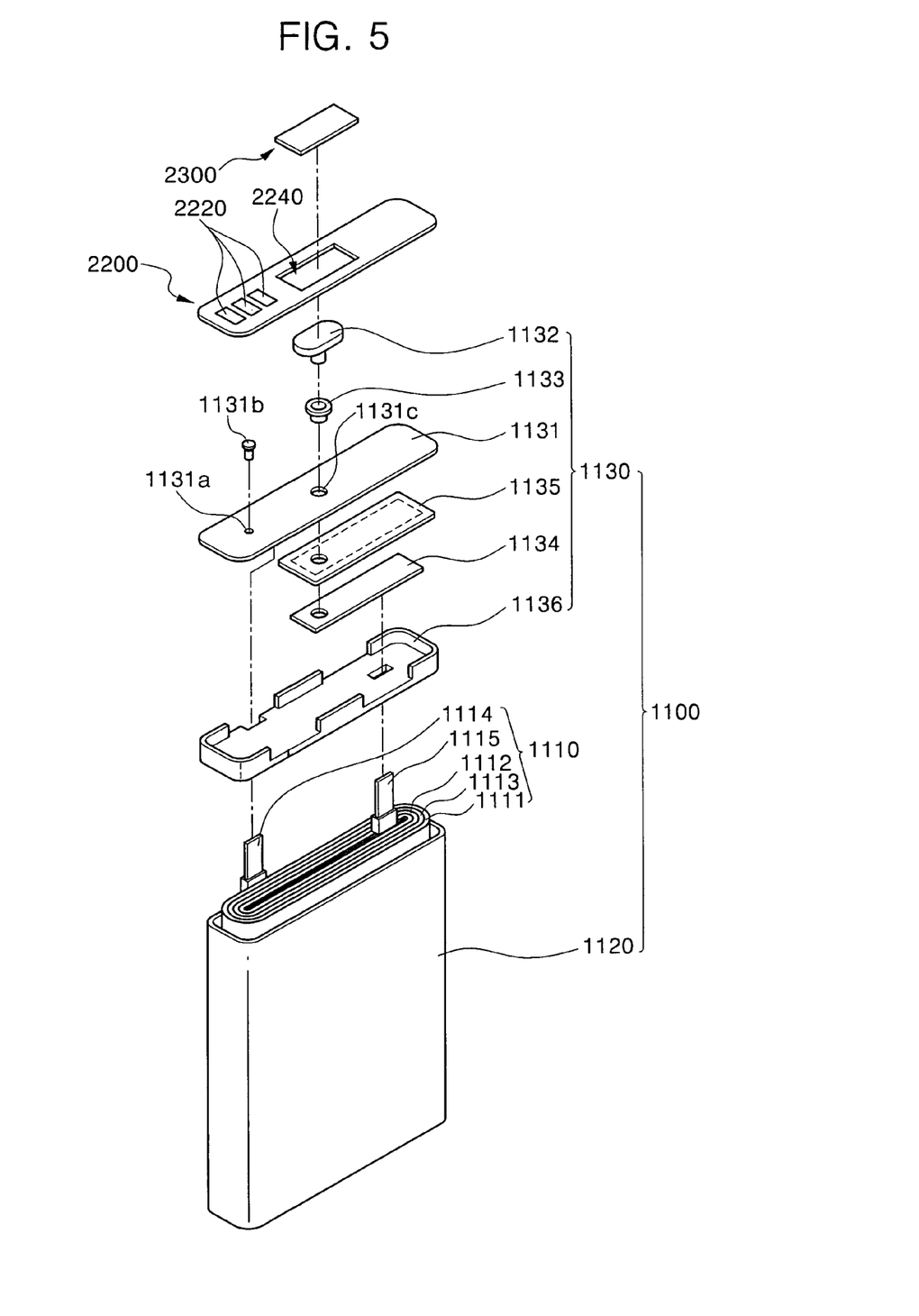
FIG. 5 is an exploded perspective view of a battery pack according to a fourth exemplary embodiment of the present invention.
Figure 6A:
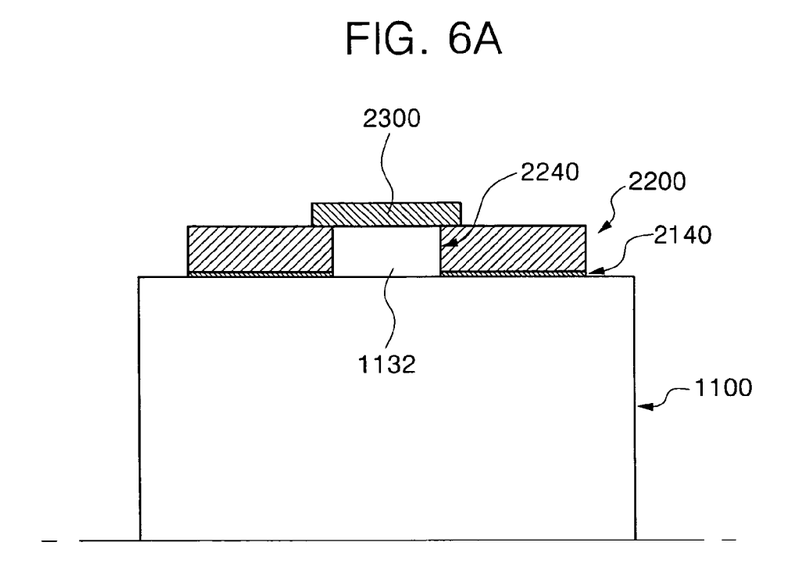
FIGS. 6A and 6B are cross-sectional views of an aperture formed in a protection circuit board of the battery pack according to the fourth exemplary embodiment of the present invention.
Figure 6B:
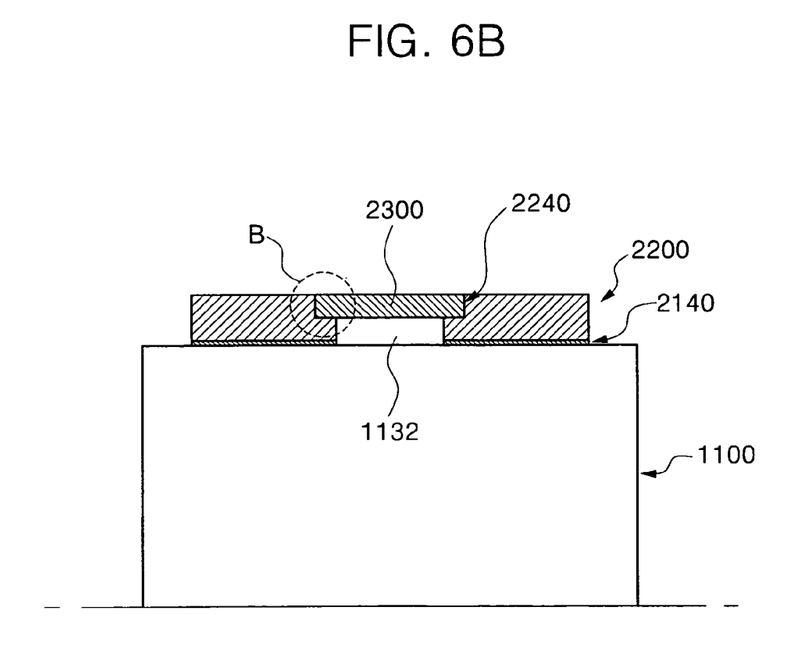

FIG. 5 is an exploded perspective view of a battery pack according to a fourth exemplary embodiment of the present invention and FIGS. 6A and 6B are cross-sectional views of the shape of an aperture formed in a protection circuit board of the battery pack according to the fourth exemplary embodiment of the present invention.

Referring to FIGS. 5, 6A and 6B, the battery pack according to the fourth exemplary embodiment of the present invention includes a bare cell 1100, a protection circuit board 2200 disposed on the bare cell 1100 and having a third aperture 2240 into which an electrode terminal 1132 of the bare cell 1100 is inserted, and a third lead terminal 2300 disposed on the protection circuit board 2200 and the electrode terminal 1132. The bare cell 1100 has the same configuration as that in the battery pack according to the first exemplary embodiment of the preset invention, and has not been described again below.

The protection circuit board 2200 has the outer terminal 2220 to be electrically connected to the outside and the third aperture 2240 to expose a part of the third lead terminal 2230 disposed at one side to the other side. The third aperture 2240, as illustrated in FIG. 6A, may have a smaller area than the third lead terminal 2300, and may include a step B to accommodate the third lead terminal 2300 as illustrated in FIG. 6B.

Alternatively, the step B of the third aperture 2240 may be formed such that only a part of the third lead terminal 2300 is inserted, and in this case, the part of the third lead terminal 2300 may be bent in a direction of the third aperture 2240 to be inserted into the third aperture 2240.

Furthermore, not illustrated in the drawings, to prevent an overvoltage and an overcurrent to the bare cell 1100, at least one protection device mounted on the protection circuit board 2200 may be disposed at the same side as the third lead terminal 2300, and the electrode terminal 1132 of the bare cell 1100 may be inserted into the third aperture 2240, thereby further reinforcing bonding strength between the bare cell 1100 and the protection circuit board 2200 of the battery pack according to the fourth exemplary embodiment of the present invention, and decreasing its entire thickness or increasing capacity as compared with conventional battery packs of the same size.

Figure 6C:
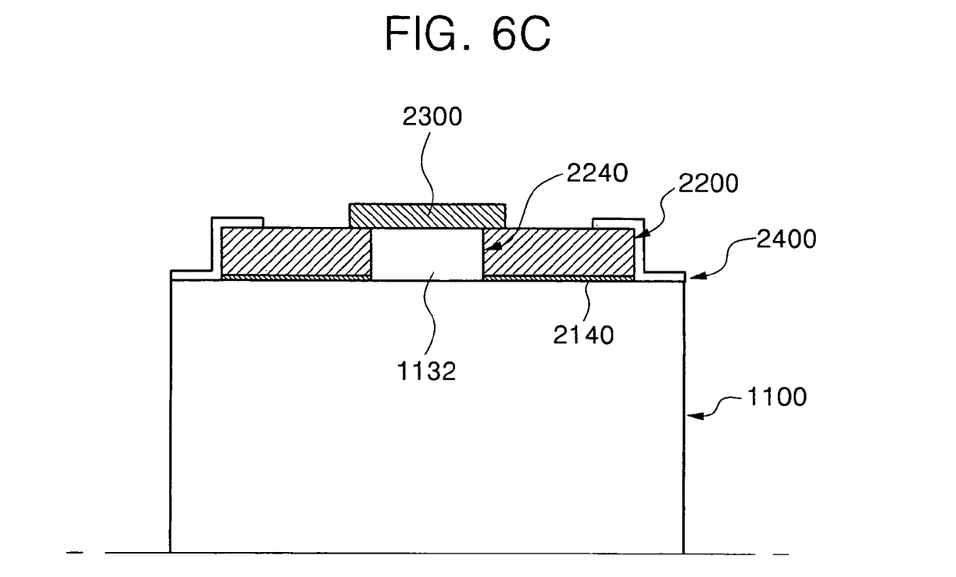
FIG. 6C is a cross-sectional view of a lead terminal of the battery pack according to the fourth exemplary embodiment of the present invention.

To prevent unnecessary electrical connection between the protection circuit board 2200 and a cap plate 1131 of the bare cell 1100, as illustrated in FIGS. 6A and 6B, an insulating tape 2140 may be arranged between the protection circuit board 2200 and the cap plate 1131 of the bare cell 1100. As illustrated in FIG. 6C, second coupling members 2400 disposed at both sides in a width direction of the bare cell 1100 and surrounding the sides of the protection circuit board 2200 may be formed. One of the second coupling members 2400 may have conductivity to electrically connect the bare cell 1132 to the protection circuit board 2200, and serve as a lead terminal having a polarity opposite to the electrode terminal 1132 and the third lead terminal 2300.

In a process of welding the electrode terminal 1132 of the bare cell 1100 inserted into the third aperture 2240 to the third lead terminal 2300, the third lead terminal 2300 and the protection circuit board 2200 may be welded around the third aperture 2240, thereby electrically connecting the bare cell 1100 to the protection circuit board 2200, which may result in a decrease in processing time as compared with the battery pack according to the first exemplary embodiment of the present invention. To facilitate the welding between the third lead terminal 2300 and the electrode terminal 1132, the third lead terminal 2300 and the electrode terminal 1132 may be formed of the same material, or have a plating part for reinforcing conductivity in a region where the third lead terminal 2300 is in contact with the electrode terminal 1132. Preferably, the third lead terminal 2300 and the electrode terminal 1132 are formed of a nickel material in consideration of weldability and conductivity.

The third lead terminal 2300 may be electrically connected to the protection circuit board 200 or the electrode terminal 1132 by soldering. In this case, the third lead terminal 2300 includes at least one fourth aperture (not illustrated) disposed inside the third aperture 2240, and the first and second apertures are filled with lead, and thus the electrode terminal 1132, the third lead terminal 2300 and the protection circuit board 1200 may be electrically connected to each other at the same time.

As a result, in the battery pack according to the fourth exemplary embodiment of the present invention, the electrode terminal of the bare cell is inserted into the aperture formed in the protection circuit board, and the electrode terminal is electrically connected to the third lead terminal disposed on the protection circuit board and corresponding to the aperture in the protection circuit board, and thus a space between the bare cell and the protection circuit board may be minimized, and the bonding strength between the bare cell and the protection circuit board may be reinforced.

Figure 7:
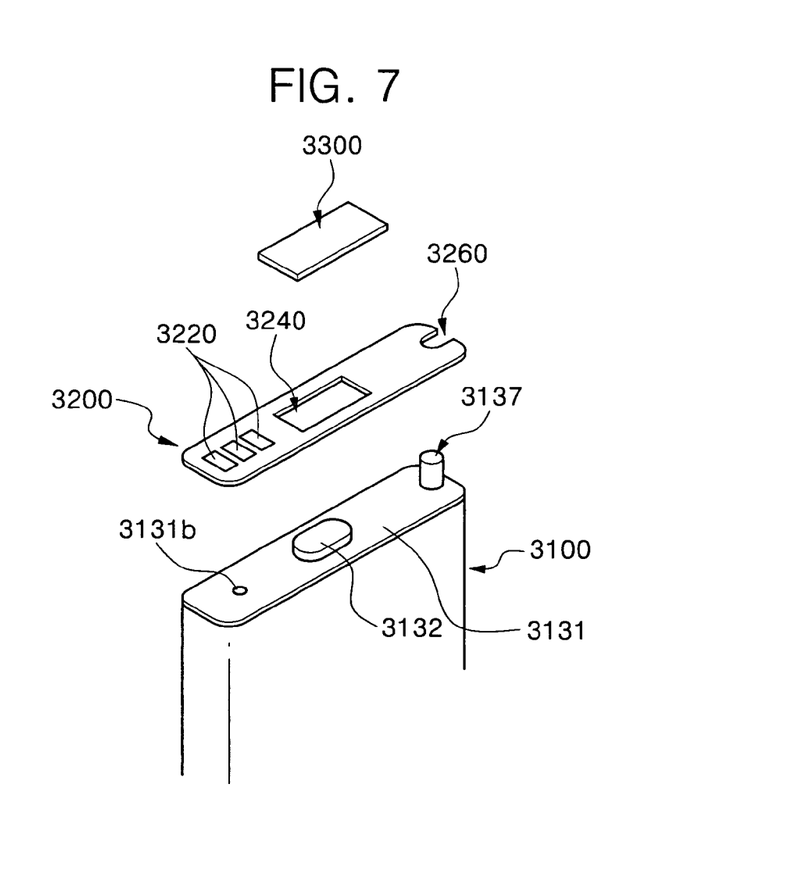
FIG. 7 is an exploded perspective view of a battery pack according to a fifth exemplary embodiment of the present invention.

FIG. 7 is an exploded perspective view of a battery pack according to a fifth exemplary embodiment of the present invention.

Referring to FIG. 7, the battery pack according to the fifth exemplary embodiment of the present invention includes a bare cell 3100 having an electrode terminal 3132 and a cap plate 3131 with a protrusion 3137 at one side thereof, a protection circuit board 3200 disposed on the bare cell 3100 and having a fifth aperture 3240 into which the electrode terminal 3132 of the bare cell 3100 is inserted and a groove 3260 corresponding to the protrusion 3137, and a fourth lead terminal 3300 disposed on the protection circuit board 3200 and the electrode terminal 3232. The bare cell 3100 has the same configuration as that of the battery pack according to the first exemplary embodiment of the present invention, except for the cap plate 3131, and has not been described below.

While the protection circuit board 3200 has a very similar configuration to the protection circuit board 2200 according to the fifth exemplary embodiment of the present invention described above, the groove 3260 corresponding to the protrusion 3137 formed at one side of the cap plate 3131 of the bare cell 3100 is formed in the protection circuit board 3200. In FIG. 7, while the protrusion 3137 and the groove 3260 are formed at one side of the bare cell 3100 and the protection circuit board 3200, respectively, the protrusion 3137 and the groove 3260 may be formed at both sides in a width direction thereof, or at one side or both sides in a longitudinal direction thereof. Then protection circuit board 3200 may have an aperture instead of the groove 3260 corresponding to the protrusion 3137.

Also, not illustrated in the drawing, the battery pack according to the fifth exemplary embodiment of the present invention may further include a fifth lead terminal (not illustrated) disposed at one side of the protection circuit board 3200 and partially exposed to the other part thereof through the groove 3260, and the fifth lead terminal may be formed of the same material and in the same shape as the first to fourth lead terminals described above.

The fourth lead terminal 3300 has the same configuration as the third lead terminal 2300 of the battery pack according to the fourth exemplary embodiment of the present invention described above, and has not been described below. In FIG. 7, in the battery pack according to the fifth exemplary embodiment of the present invention, the electrode terminal 3132 of the bare cell 3100 is inserted into the fifth aperture 3240 of the protection circuit board 3200, and the fourth lead terminal 3300 is disposed on the protection circuit board 3200. However, the fourth lead terminal 3300 may be disposed between the protection circuit boated 3300 and the bare cell 3100 as in the battery pack according to the first exemplary embodiment of the present invention.

As a result, in the battery pack according to the fifth exemplary embodiment of the present invention, the protrusion is formed at one side or both sides in a width direction of the cap plate of the bare cell, and the aperture or groove corresponding to the protrusion is formed in the protection circuit board, so as to electrically connect the bare cell to the protection circuit board using the lead terminal and the electrode terminal of the bare cell, and thus a second polarity opposite to a first polarity electrically connected to the protection circuit board is electrically connected between the bare cell and the protection circuit board. Thus, a space between the bare cell and the protection circuit board may be minimized, and a bonding strength between the bare cell and the protection circuit board may be further reinforced.

Consequently, a battery pack according to the present invention can minimize a space between a bare cell and a protection circuit board and reinforce bonding strength therebetween without separate components by electrically connecting an electrode terminal with a first lead terminal electrically connected to the protection circuit board through an aperture formed at one side of the protection circuit board.

The bonding strength between the bare cell and the protection circuit board may be further reinforced by electrically connecting the protection circuit board to a cap plate or a can of the bare cell using a second lead terminal having a different polarity from the first lead terminal and the electrode terminal, or by electrically connecting the protection circuit board to one side of the bare cell, which is partially inserted into the protection circuit board, using the second lead terminal.

Although the present invention has been described with reference to certain exemplary embodiments thereof, it will be understood by those skilled in the art that a variety of modifications and variations may be made to the present invention without departing from the spirit or scope of the present invention defined in the appended claims.

What is claimed is:

1. A battery pack, comprising:
    a bare cell including an electrode terminal, a cap plate and a gasket insulating the electrode terminal from the cap plate, a polarity of the cap plate being different from a polarity of the electrode terminal;
    a protection circuit board including a first aperture in a region corresponding to the electrode terminal, the first aperture penetrating the protection circuit board;
    a first lead terminal electrically connected between the electrode terminal of the bare cell and the protection circuit board, the first lead terminal disposing on the electrode terminal of the bare cell; and
    a second lead terminal electrically connected between the cap plate of the bare cell and the protection circuit board,
    wherein the first lead terminal and the second lead terminal are connected to a first side of the protection circuit board,
    wherein the first lead terminal having a rectangular prism shape with six surfaces, at least four of the six surfaces are completely embedded into and in direct contact with the protection circuit board with only a portion of a fifth surface of the six surfaces of the first lead terminal being exposed to the first aperture and another portion of the fifth surface is in direct contact with the protection circuit board, a portion of a sixth surface of the six surfaces in direct contact with the electrode terminal and another portion of the sixth portion not in contact with any structure.

2. The battery pack according to claim 1, wherein a thickness of the first lead terminal is smaller than a thickness of the protection circuit board.

3. The battery pack according to claim 2, wherein the first lead terminal is within the first aperture.

4. The battery pack according to claim 3, wherein the first aperture has a step to accommodate the first lead terminal.

5. The battery pack according to claim 1, wherein the first lead terminal has at least one second aperture in a region corresponding to the first aperture.

6. The battery pack according to claim 1, wherein the first lead terminal is in contact with the electrode terminal of the bare cell, and the second lead terminal is in contact with the cap plate of the bare cell.

7. The battery pack according to claim 6, wherein the first side of the protection circuit board faces the cap plate of the bare cell.

8. The battery pack according to claim 1, wherein a size of the first aperture of the protection circuit board is smaller than a size of the first lead terminal.

9. The battery pack according to claim 1, wherein a size of the protection circuit board is smaller than a size of the cap plate of the bare cell.

10. The battery pack according to claim 1, further comprising:
    a support member arranged between the bare cell and the protection circuit board to seat the protection circuit board.

11. The battery pack according to claim 1, further comprising:
    an upper case surrounding the protection circuit board, and having at least one fourth aperture corresponding to an outer terminal of the protection circuit board.

* * * * *